(No Model.) 8 Sheets—Sheet 1.

H. F. GRAY.
ELECTRIC TELPHER TOWING SYSTEM.

No. 586,516. Patented July 13, 1897.

Attest:
C. W. Benjamin
T. F. Conrey

Inventor,
Harding F. Gray (No Model.) 8 Sheets—Sheet 2.

H. F. GRAY.
ELECTRIC TELPHER TOWING SYSTEM.

No. 586,516. Patented July 13, 1897.

Attest:
C. W. Benjamin
T. F. Conrey

Inventor:
Harding F. Gray (No Model.) 8 Sheets—Sheet 3.

H. F. GRAY.
ELECTRIC TELPHER TOWING SYSTEM.

No. 586,516. Patented July 13, 1897.

Attest:
C. W. Benjamin
T. F. Conrey

Inventor,
Harding F. Gray (No Model.) 8 Sheets—Sheet 5.

H. F. GRAY.
ELECTRIC TELPHER TOWING SYSTEM.

No. 586,516. Patented July 13, 1897.

Attest:
C. W. Benjamin
T. F. Conrey

Inventor:
Harding F. Gray (No Model.) 8 Sheets—Sheet 6.

H. F. GRAY.
ELECTRIC TELPHER TOWING SYSTEM.

No. 586,516. Patented July 13, 1897.

ATTEST:
T. F. Conrey.
D. H. Decker.

INVENTOR:
Harding F. Gray (No Model.) 8 Sheets—Sheet 7.
H. F. GRAY.
ELECTRIC TELPHER TOWING SYSTEM.

No. 586,516. Patented July 13, 1897.

Attest
C. W. Benjamin
T. F. Conrey

Inventor,
Harding F. Gray (No Model.)  8 Sheets—Sheet 8.

H. F. GRAY.
ELECTRIC TELPHER TOWING SYSTEM.

No. 586,516. Patented July 13, 1897.

Attest:
C. W. Benjamin
T. F. Conroy

Inventor,
Harding F. Gray

THE NORRIS PETERS CO., PHOTO-LITHO., WASHINGTON, D. C.

UNITED STATES PATENT OFFICE.

HARDING F. GRAY, OF PASSAIC, NEW JERSEY, ASSIGNOR, BY DIRECT AND MESNE ASSIGNMENTS, TO THE INTERNATIONAL ELECTRIC TRANSIT COMPANY, OF NEW YORK, N. Y.

ELECTRIC TELPHER TOWING SYSTEM.

SPECIFICATION forming part of Letters Patent No. 586,516, dated July 13, 1897.

Application filed February 14, 1894. Renewed October 19, 1896. Serial No. 609,366. (No model.)

*To all whom it may concern:*

Be it known that I, HARDING F. GRAY, a citizen of the United States, and a resident of Passaic, in the county of Passaic and State of New Jersey, have invented certain new and useful Telpher Towing Systems, of which the following is a specification.

My invention relates to electrical systems for towing canal-boats, and has for its object the utilization for this purpose of that class of systems commonly termed the "telpher" systems.

The only practical manner of moving canal-boats is by towing them, since the usual means of propulsion located thereon creates such a commotion in the narrow body of water in which they move as to cause the banks thereof to be washed and quickly destroyed. For this reason the trolley towing system has been found to be impracticable. The storage-battery system is just as impracticable, as in both instances it is necessary to employ a screw or other propeller in the operation of which the reaction of the water is depended upon and excessive bank-washing follows as a natural consequence. Electrical towing then resolves itself into a system wherein the motor shall travel on land and tow the boat. In constructing an electrical system to operate in this manner I have found the telpher system of locomotion the best adapted to the purpose.

My invention consists in a special construction of telpher system for this purpose and in a particular manner of mounting said system, since it is essential in equipping a canal with any towing systems to so locate such system that it shall not interfere with or prevent the use of mules or horses for towing.

My invention also consists in various details of construction and combinations of parts, as will be hereinafter fully described, and pointed out in the claims.

In carrying out my invention I preferably use a motor-car of such dimensions that it will accommodate a motorman who shall stop and start the car and control the current thereto as circumstances require. This car I run upon cables or tracks supported on suitably-braced poles at the side or in the middle of the canal or by suspension devices stretched across it. The up and down motor-cars may be run on the same poles, but it is preferable to place the up system on one side of the canal and the down system on the other. On the tow-path side the poles are placed just outside of the path, so as to allow towing in the ordinary way when desired. On the heel-path the poles may be placed close to the canal. In building a system of this sort there are many details of construction which need special attention and these I have worked out with great care, so that my system as disclosed shall be perfect in all respects.

In the accompanying drawings, which form a part of this specification, Fig. 14ᵃ is a vertical section through said box and one of the supporting-posts for the feed-wire. Figs. 28, 29, and 30 illustrate modifications hereinafter referred to.

In the drawings, 1 represents the poles for supporting the tracks or cables 2 and 3, upon which the car 4 runs. These poles are all braced against lateral and longitudinal strains by means of the braces 5, which, as seen in Figs. 1 to 4, project from the pole toward the canal and extend in opposite directions. Upon these braces are secured brackets 6, in the upper ends of which the lower or traction cable 3 is secured. The brackets are thoroughly braced against lateral movement by braces 7 and against longitudinal movement by the cross-braces 8, the ends of which are clamped between the two portions forming the uprights of brackets 6.

The upper or working-circuit cable 2 is supported at the outer end of a bracket formed by the arm 9 and its braces 10 and 11. The upper cable may be a continuous conductor for supplying current to the motors on the car, the lower cable acting as a return-conductor; or the upper cable may be divided into sections and suitable switches provided for throwing the sections successively into and out of circuit as the car proceeds. I prefer to use the sectional system, as it is almost impracticable over a long line to use a continuous cable as the working circuit on account of the difficulty in properly insulating it. It is also preferable to use the sectional conductor to prevent accidents occurring from wires falling across live conductors or from said conductors falling or coming within the reach of man or beast.

Figures 3, 7, 8:
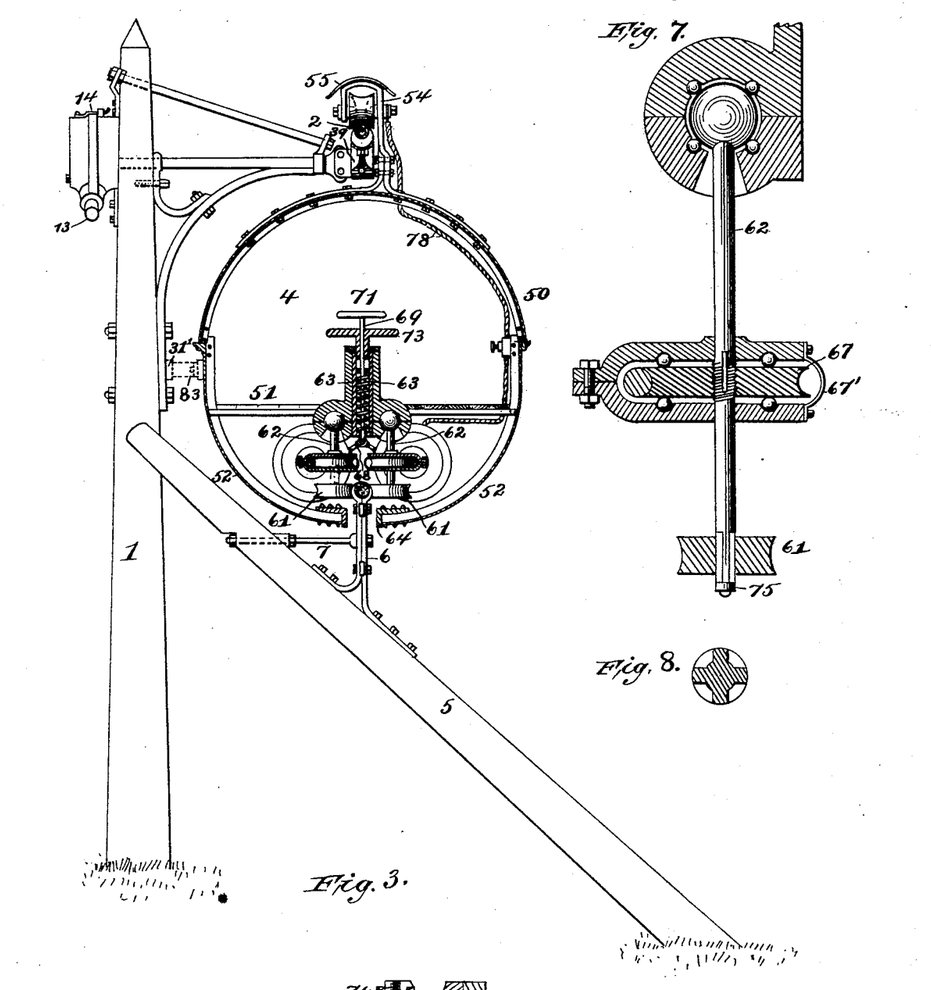
Fig. 3 is a vertical transverse section of the motor-car.
Fig. 7 is a section, on an enlarged scale, of one of the grips.
Fig. 8 is a section of that portion of the grip-shaft on which the grip-wheel is mounted.
Figures 14, 15, 16, 17, 18, 19, 20, 21:
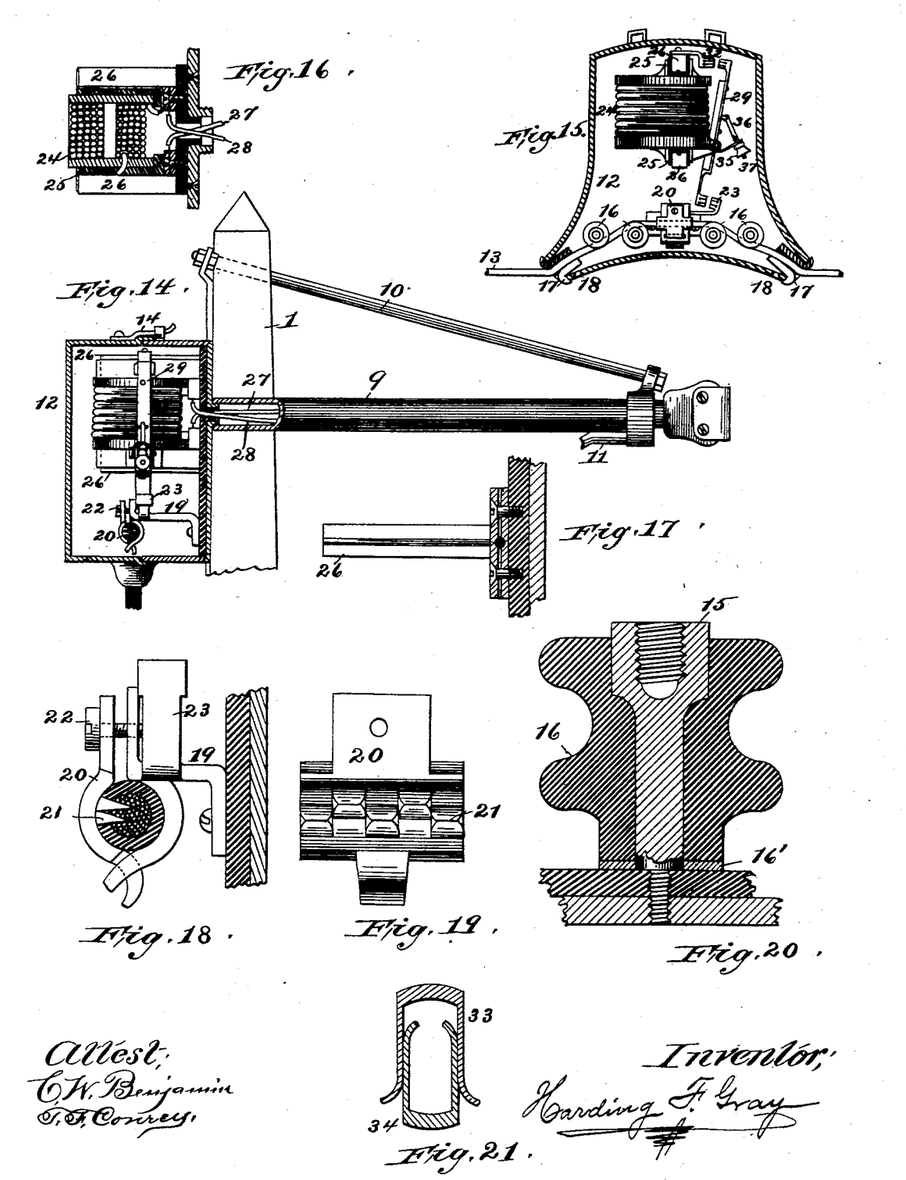
Fig. 14 is a section through one of the brackets for supporting the upper cable and also through the switch-box.
Fig. 15 is a view of the interior of the switch-box.
Fig. 16 is a vertical section through the switch-magnet, showing its means of support and its connections.
Fig. 17 is a detail of one of the supporting contact-posts for said magnet.
Fig. 18 is a side view of the contact-clamp for the feed-wire.
Fig. 19 is a face view of the contact portion of said clamp.
Fig. 20 is a section through one of the feed-wire insulators and its supporting-posts.
Fig. 21 is a transverse section through a pair of the contact-springs of the switch.
Figure 14A:
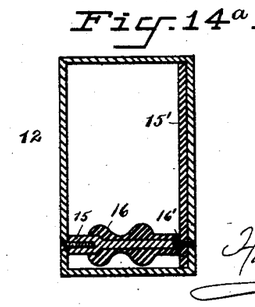

Whether using a continuous working circuit or a sectional one I employ a feed-wire with taps running therefrom to the working circuit at convenient intervals. I shall describe my system, however, as having a working circuit formed of insulated sections, the insulations occurring at the supports therefor. In this construction I place an electrical switch in the tap from the feed-wire to the working circuit, which switch is constructed to be operated by a current from a battery or any suitable source carried on the car, and when operated to close the main circuit said main circuit shall hold the switch closed until the car has passed from the section controlled thereby. In the drawings said switches are shown as located in boxes 12, mounted upon posts 1. Through these switch-boxes the feed-wire 13 passes. The tap from said wire leads to the switch, and the conductors from the switch to the working circuit are passed through arm 9. Each switch-box has a screw-threaded boss on the back thereof by which it is connected to the end of arm 9, which passes through the post. This construction not only furnishes a tight conduit for the wires leading from the switch to the feeding-circuit, but it also provides an additional securing means for the arm 9 and for the switch-box. The switch-box is further secured to the pole by means of projections formed at its upper and lower ends, which are secured upon the ends of the bolts and braces of the brackets, as seen in Fig. 3. The switch-box is divided vertically, and the removable portion or cover thereof has upon its edge a flange fitting over the other portion and is provided at its top with hooks 14, which pass under staples on the fixed portion of the box. Through the lower portion of the cover pass screws into the ends of posts 15, which project from the fixed portion of the box, the back of which is lined with insulation, Fig. 14$^a$. Upon these posts 15 are mounted insulators 16, of porcelain or other suitable material, between which the feed-wire passes and is secured. When porcelain insulators are used, it is advisable to place soft rubber, as at 16', between them and the box to prevent them from breaking should the posts sag.

The lower corners of the switch-box are produced and are provided with apertures for the reception of bushings 17, through which the feed-wire passes. These bushings consist of insulation and are split along one side to provide for slipping them upon the feed-wire. Before inserting them in place pieces of thin insulating material, as paper or fiber, are wrapped about the wire, so as to thoroughly fill the space between them and the box. They are then crowded into their apertures with the split downward, and as the cover of the box is screwed to place they are tightly clamped upon the feed-wire. In the lowermost corners of the switch-box I also provide apertures 18 for ventilation and for the discharge of any moisture which may condense within the box.

I employ a novel means for tapping the feed-wire, which consists in inserting the end of a conductor between the meshes of the cable which I use as a feeder. This may be done in various ways, but I have illustrated it in detail in Figs. 15, 18, and 19 as done in the most practical manner for my especial purpose.

Upon the back of the switch-box I mount in an insulated manner a bracket 19, which carries a plate, grooved to fit the cable and provided with a slot at its lower end and a screw-hole at its upper end. To coöperate with this plate, I provide another plate 20, curved to fit the cable and provided with a tongue at its lower end and a perforation for a screw at its upper end. On the interior curved surface of this plate I form slender flat projections 21, which, when the plate 20 is clamped upon the cable by means of screw 22, will pierce the insulation of the cable and enter in between the meshes thereof. Any suitable clamping means for forcing plate 20 to place may be used, but I have shown a screw as a common and convenient form. The bracket 19 has formed thereon or secured thereto a conductor 23, which for my purposes I terminate in a contact for engaging with the contact carried by the armature of the switch.

In an exposed switch-box it is desirable to have the magnet so constructed and mounted that it may be readily removed and replaced in case it may be damaged by lightning or otherwise. For the purpose I form upon the ends of the electromagnet 24 the brackets provided with slides lined with insulation 25, and in the surface of this insulation I partially embed the bared ends of the magnet-coil.

Upon the back of the switch-box I mount in an insulated manner two posts 26, of conducting material, constructed to slide in the insulated ways and being slightly recessed on their facing sides for the reception of the bared ends of said coil. The lower ends of these posts are provided with clamps for making secure and complete contact with wires 27 and 28, which lead to the working-circuit conductor through the arm 9 of the brackets supporting said conductor.

Upon one of the brackets at the end of the switch-magnet is pivoted the armature, which carries a contact-arm 29, provided with a contact at its end; also upon one of the posts 26 is secured a contact 32, coöperating with one of the armature-contacts.

Figure 22:
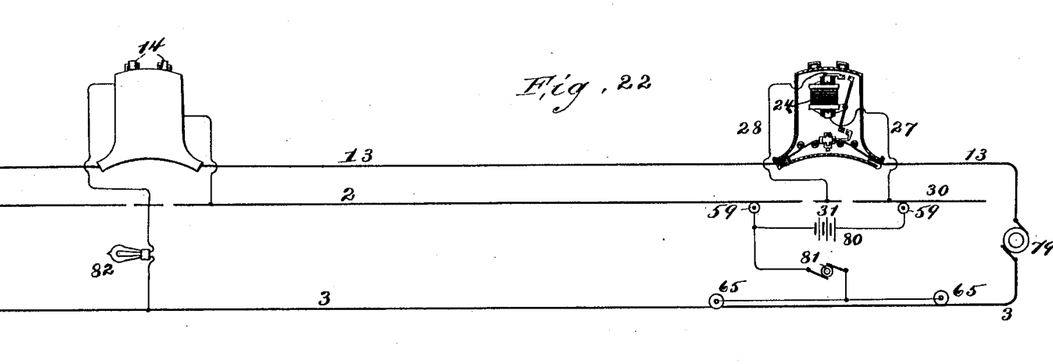
Fig. 22 is a diagrammatic representation of my system in a preferred form.

It will be seen in Fig. 22 that wire 27 leads directly from the magnet to a longer section 30 of the working circuit and that wire 28 leads directly to the short section 31 of the working circuit, thereby forming a connection between said two sections through the magnet-coil. The connection from the feed-wire to section 30 is made by way of transmitting-contact 23, armature-bar 29, receiving-contact 32, post 26, to which said contact is connected, the coil of the magnet, the other post 26, and wire 27. The form of contacts which I propose to use in this switch is clearly shown in Fig. 21. Each of the contacts 33 34 consists of a U-shaped piece, branches of which are resilient, the branches of one contact fitting between the branches of the other. In a switch of this form it is necessary to employ a strong retracting-spring. The form of spring best adapted for the purpose I have shown at 35 in Fig. 15. This spring is secured at one end to the armature-support and is wrapped about the pivot of the armature, its opposite end passing over a screw 36, hinged to the rear of the armature-bar. On this screw is a nut 37 for regulating the tension of said spring.

It will be noticed in a switch as described above any injury to the magnet may be readily remedied by removing the magnet and placing another upon its supports.

Figures 2, 5, 11, 12, 13:
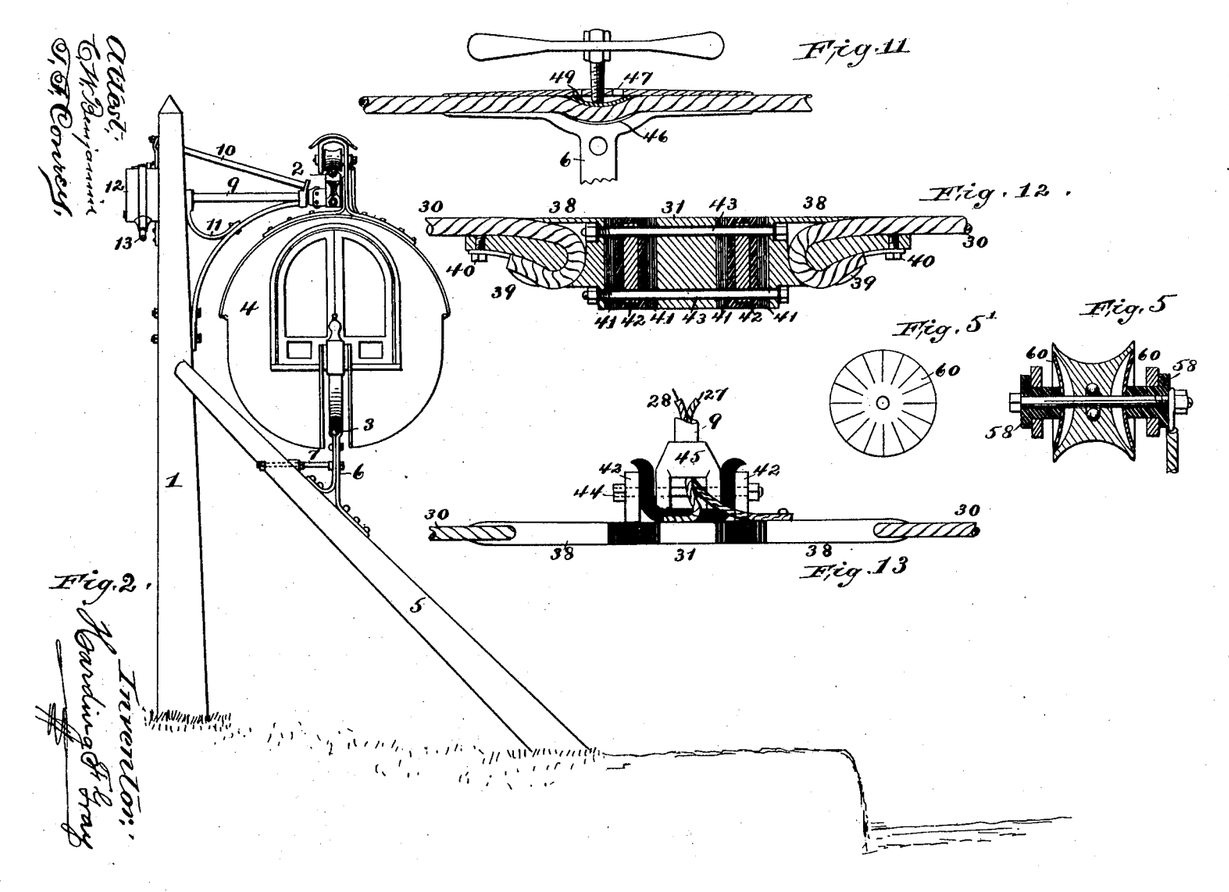
Fig. 2 represents a transverse section of Fig. 1 on a slightly-increased scale.
Figs. 5 and 5' represent the construction of one of the suspension-trolleys.
Fig. 11 represents a vertical longitudinal section through one of the supporting-brackets for the lower or traction cable, illustrating the manner of securing said cable against slipping.
Figs. 12 and 13 represent, respectively, in longitudinal section and plan the manner of attachment of the sections of the upper cable or working conductor.

My plan of connecting and supporting the several sections of the working circuit is illustrated in Figs. 3, 12, and 13. The end of each section 30 is secured in a block 38, provided with a channel through which the end of the cable is passed and recurved, the recurved end being secured by clips 39, hammered down upon it. The core of the cable may also be bared and passed around the head of a screw 40, turned into said block. Between these two blocks 38 is located the short section 31. At each end of the short sections and at the inner ends of said blocks are placed graduated resistances 41, consisting of plates of insulation and iron alternating with each other. Between these graduated resistances are located the supporting-plates 42, which are separated from said resistances by insulation, which is also carried over the edges of said blocks. The short section, graduated resistances, plates, and insulation are all bolted together by properly-insulated bolts 43. The plates 42 project from their connection with the cable and are perforated for the passage of bolt 44, which bolt secures them to the bifurcated clip 45 upon the end of arm 9, a heavy strip of insulation being interposed between said clip and the cable and supporting-plates. The graduated resistances serve to prevent sparking as the trolley-wheels pass from one section to another. Fig. 13 clearly shows this connection between the arm 9 and cable, and it also shows conductors 27 and 28, connected to their respective sections 30 and 31.

I have found it necessary to contrive a means for fastening the traction-cable within its supporting-brackets which shall positively prevent any sliding of the cable in said brackets.

It will be noticed that the brackets 6 are formed of one piece, provided with an elongated loop at the upper end, through which the traction-cable passes. This elongated loop has on its inner surface a depression (shown in Fig. 11) at 46. Above this depression there is formed, through the said loop, perforations 47, one of which is screw-threaded for the insertion of a tool 48. Under this screw-threaded perforation a thin plate 49 is placed upon the cable to receive the point of the tool, which I use for depressing the cable, as shown in said figure. When the cable has been forced down into depression 46, molten metal is poured through perforations 47 until it completely fills all vacancies about the conductor at this point. In this way a positive kink is made and retained in the cable, which will prevent it from sliding in the bracket.

Figures 1, 24, 25:
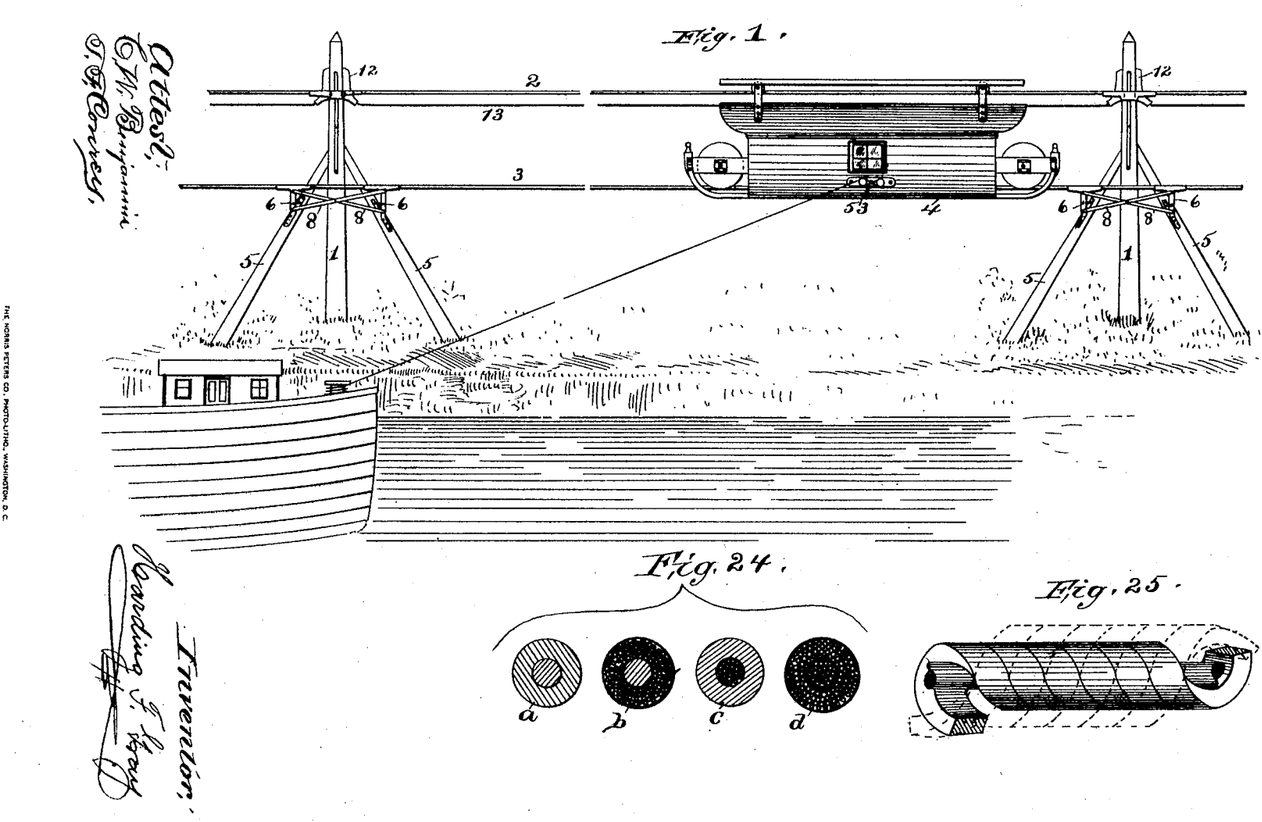
Figure 1 illustrates a portion of my system, showing two poles with the cables and feed-wire mounted thereon and a car with a tow-line connected thereto.
Fig. 24 represents in cross-section the constructions of cables which I have found most advantageous for use in my towing system.
Fig. 25 is a side view of a portion of the preferred form of cable.

The car for my towing system may be constructed in any desired manner, but I prefer to make it substantially as shown in the drawings and of sufficient size to accommodate a motorman. The car consists of the main body portion 50, provided with a floor 51, and the downward-projecting shields 52, for protecting the motors and grip mechanism. A cleat 53, Fig. 1, is placed upon the side of the car, to which the tow-line may be connected, or the tow-line may be connected to the ends of the car, as may be desired. The connection at the middle of the side by cleat 53 is, however, deemed the preferable one. The car is supported from the upper cable by means of suspension-trolleys located in brackets 54, securely bolted to the roof of the car. These brackets have extending from one to the other a roof 55, which also acts as a brace from one trolley-bracket to the other. This roof is necessarily insulated from said brackets when the car is to run upon a sectional conductor. In running upon a continuous conductor such insulation may of course be omitted.

Figures 4, 6, 10:
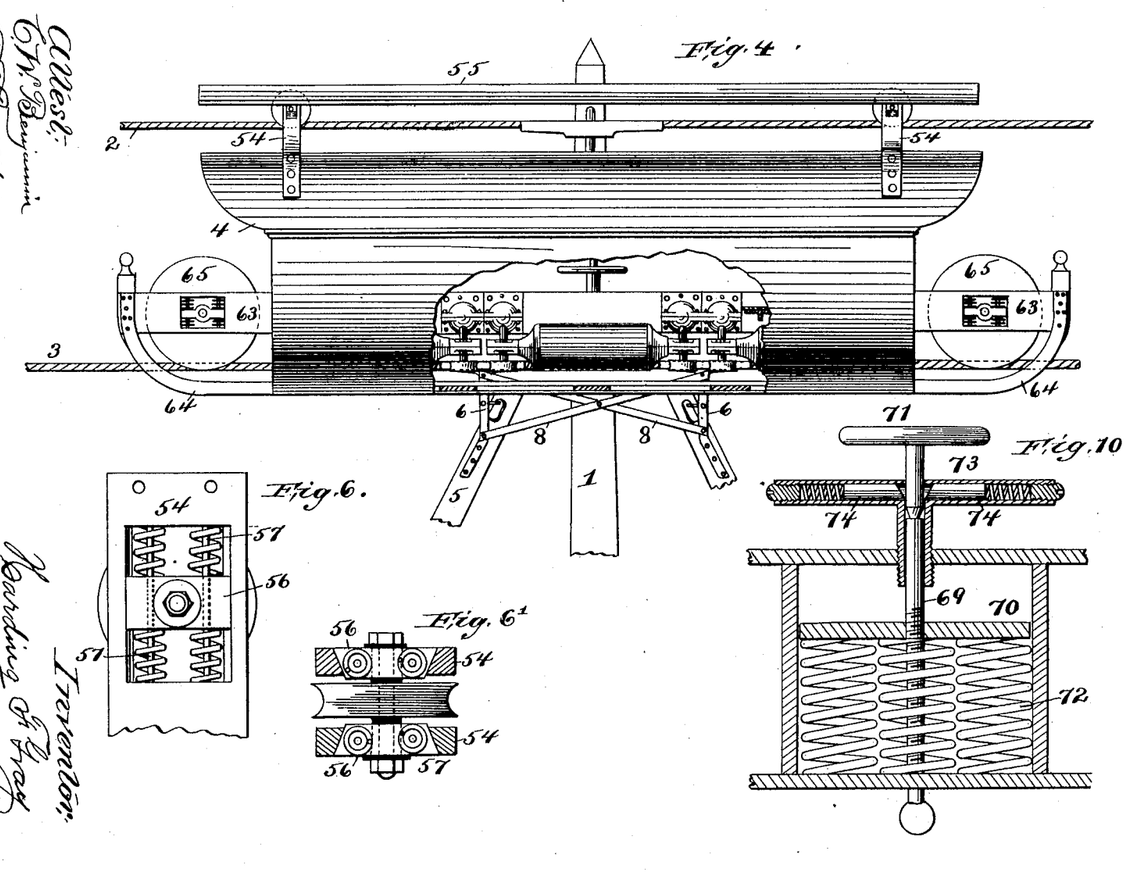
Fig. 4 is a side elevation of the motor-car, the side thereof being broken to show one of the motors and rotary propelling-grips operated thereby.
Figs. 6 and 6' are a side elevation and transverse section, respectively, on an enlarged scale, showing the manner of mounting said trolley.
Fig. 10 is a vertical longitudinal section through the grip controlling and operating mechanism.

It is deemed advisable to mount the trolleys in spring-seated journal-boxes 56, details of which are found in Fig. 6. These boxes are beveled toward each other and fit in bevel-ways in the side of the bracket 54 and slide upon pins 57, extending vertically through said boxes and secured in the bracket, the springs being placed on either side of said journal-boxes. The trolley-axis extends through the boxes, being properly insulated therefrom by bushing 58, Fig. 5, and having a nut upon one end for clamping the conductor thereto and for assisting in retaining the journal-boxes in position.

The trolley-wheel 59 I form in a special manner to provide for lateral motion upon its axis. It is mounted upon ball-bearings and its ends are concaved, and between it and bushings 58 I insert spring-disks 60, which bear at their periphery against the rim of the trolley-wheel and at their center upon said bushings.

The propulsion of the car is accomplished through rotary traction-grips consisting of wheels 61, grooved to fit the traction-cable and mounted upon shafts 62, hinged to suitable supports, so as to swing the traction-wheels to and from the cable. As a support for these shafts, the motors, and the grip-operating devices, mid-ribs 63 are extended longitudinally through the car and have secured at their outer ends the upturned ends of the divided keel 64, to which the extensions 52 of the car are also secured. This divided keel furnishes the slot through which the traction-cable and its brackets pass. Between the mid-ribs, near their ends, are also journaled, by means of spring-seated journal-boxes similar to those used in connection with the trolley, suitable wheels 65, which bear upon the traction-cable and assist in the support of the car.

I find it advisable to use a series of small motors for operating the traction-wheels, and for this purpose I use several small iron-clad motors whose armature-shafts terminate in worms meshing with worm-wheels 67, mounted upon the shafts 62. Said motors are also mounted upon shafts 62 by extending their casings so as to embrace the worm-wheels. Between the worm-wheels and said casings ball-bearings are constructed, so as to support said motors with as little friction as possible. The casing about the worm-wheels is made air-tight by securing thereto caps 67, so that oil may be contained therein, in which the worm-wheel and the ball-bearings shall run.

The shafts 62 may be hinged by means of a ball-and-socket joint which shall also be provided with ball-bearings, as shown in Fig. 7.

The weight of each motor, it will be noticed, is distributed between two shafts 62 and tends to force the traction-wheels connected to said shafts against the traction-cable. To increase this pressure upon the cable, I connect the motor-casings by a toggle-joint 68, to the middle of which is secured by a ball-and-socket joint a rod 69. This rod passes up between the mid-ribs and through a nut 70, confined between said mid-ribs and has upon its upper end a hand-wheel 71. Between the nut 70 and a plate secured to the under edge of the mid-ribs are placed coiled springs 72, which tend to force the rod 69 upward, pulling on the middle of the toggle and forcing the grip-wheels against the cable.

It will be seen that by turning the hand-wheel one way or the other nut 70 will be made to ascend or descend and thereby regulate the tension upon the springs 72, which in turn will regulate the pressure between the grip-wheels and the traction-cable.

To provide for releasing the grip from the cable, I pass a screw-threaded sleeve provided with a hand-wheel 73 at its upper end through a nut located upon the top of the mid-ribs, the shaft 69 passing through said sleeve. Within the hand-wheel 73 I locate spring-catches 74, constructed to engage a notch formed in the rod 69.

It will be seen that by turning down the hand-wheel 73 the catches 74 will enter the notch on rod 69 and carry said rod downward, which will force the middle of the toggle down, separating the motors and releasing the grip-wheels from the traction-cable.

Figure 9:
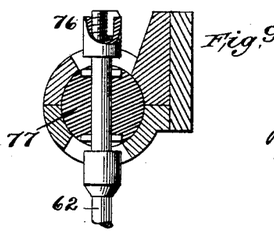
Fig. 9 is a modified form of bearing for the grip-shaft.

To provide for vertical variations in the traction-cable, it is necessary to arrange for some vertical movement of the grip-wheels. This provision may be made in several ways. One way is illustrated in Figs. 7 and 8, wherein the lower end of shaft 62 is fluted for a distance greater than the thickness of the grip-wheel to provide splines thereon, and the grip-wheel has its perforations grooved radially to fit said splines. The nut or plate 75 is then fitted to the lower end of shaft 62 to hold the grip-wheel thereon. This vertical movement of the grip-wheel may be provided for in another manner, as shown in Fig. 9, wherein shaft 62 is shown as provided with a collar near its end and a nut 76 upon its end, the intermediate portion passing through a perforated ball 77, located in the socket therefor, which is mounted, as in the previous construction, upon one of the mid-ribs.

Figure 28:
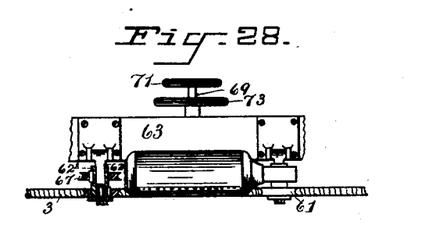

Various means of supporting the swinging grip-wheels may be employed aside from those which I have illustrated. One simple means may consist in hinging the shafts rigidly to the mid-ribs and mounting the worm-wheels and traction-wheels upon a sleeve constructed to rotate upon the shafts. This would constitute, in effect, a hinged frame carrying the motors and grip-shafts, an illustration of which is seen in Fig. 28. The shafts 62' are hinged to one of the mid-ribs 63 and have hollow shafts 62² sleeved thereon, to which are keyed the worm-wheels 61. Suitable stops are provided on shafts 62' for retaining the hollow shafts in place, and the motor-casings are secured to the shafts 62² in the same way as to shafts 62'. Frames for carrying the motors and the parts operatively connected thereto might be hinged in any other suitable way to the mid-ribs or other support, the grip-shaft being journaled therein in any suitable manner.

The conductor for transmitting the current from the upper trolley to the motors I have indicated at 78 in Fig. 3 as connected to the trolley-axle, passing down into the car and through any suitable hand-switch to the motors. The current may then pass from the motor-casings through the shafts 62 to the traction-cable, which acts as the return-circuit, or it may be led to the wheel 65, as may be desired.

The operation of my system may be briefly explained in connection with Fig. 22, wherein the source of current is typified at 79, which source is shown coupled to the feed-wire 13 and to the return-circuit 3. The trolley-wheels 59 are shown connected through a source of electrical energy 80, which may be a motor-generator or a primary or secondary battery. The car-motor is indicated at 81 as in circuit between the trolley and the wheels 65 of the car. As the car passes from one section to another the trolleys span the insulation between the sections, and as the last trolley enters upon the short section 31 a current from battery 80 is sent through the switch-magnet and the switch is closed. As soon as the switch is closed the main circuit from the feeder 13 passes through the switch-magnet, as above described, and retains the circuit closed so long as the car is upon section 30. I have shown also a lamp at 82, located between the short section 31 and the return-circuit. This lamp, it will be seen, will also be in circuit so long as the switch is closed—that is, so long as the car is upon section 30, to which section 31 is connected through the switch. This will act as a signal to any following car, showing that the section ahead is occupied.

Figure 23:
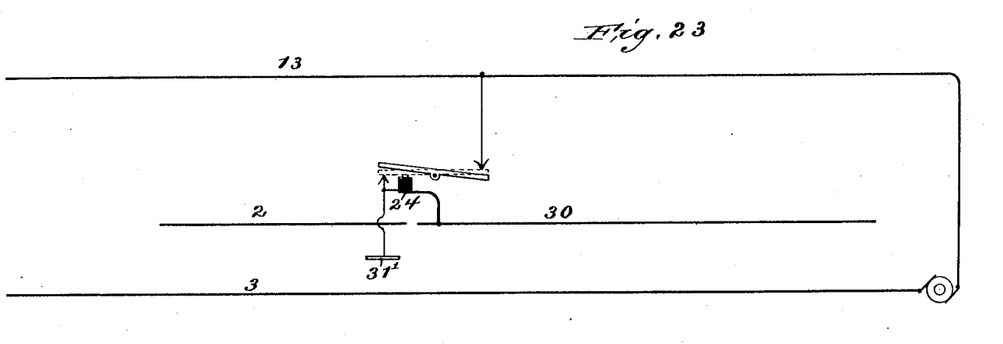
Fig. 23 is a modification thereof.

In Fig. 23 I have illustrated a slight modification of my system, wherein a short section 31', corresponding to short section 31, is shown out of alinement with the working circuit and may be located in the form of a contact upon a support for the system, as indicated in Fig. 3 by dotted lines. From this short section a permanent circuit connection is made to section 30 of the working conductor. In this permanent section is located the coil of the switch-magnet 24. As the car progresses over this system instead of the current from the battery carried thereon passing through the trolleys and the switch-magnet it will pass through one trolley, section 30, the switch-magnet to the contact-brush, as 83, located upon the car, (see dotted lines, Fig. 3,) and return to the battery. This will cause the armature to be attracted, when the main circuit will pass from the feeder to the working circuit, as in the system above described.

Glazed doors may be located in the end of the car, as indicated in Fig. 2, and windows may be placed in the cars as desired, one being preferably located near the cleat 53 to provide for attaching and detaching the tow-line.

Figure 29:
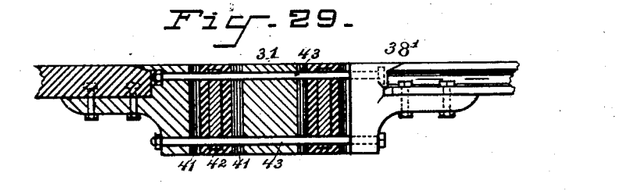
Figure 30:
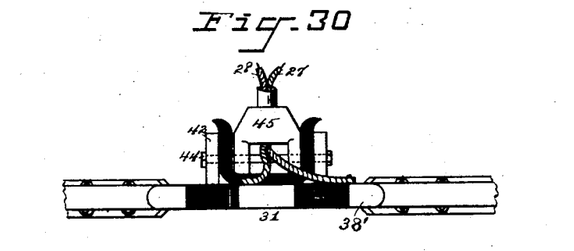

I have shown cables as forming the tracks or lines of way, though steel bars or rails might be used instead, but the cableway can be constructed with much less expense and serves the purposes of my system equally well. Should it be desired, however, to use steel rails, they may be mounted on the supports substantially as shown in Figs. 29 and 30 or in any other desired manner. When mounted as shown in said figures, it is only necessary to modify the form of the blocks 38. (Shown in Figs. 12 and 13.) The substitute blocks 38' are provided with flanged portions, as shown, to which the ends of the rails are bolted, said blocks being bolted together by bolts 43 and connected to the support as before.

The cables used in this system for the working circuit and particularly for the return or traction circuit must be of a construction that will resist wear and at the same time be satisfactorily conductive. For this purpose I use a bimetallic cable consisting of a copper core, Figs. 24 and 25, and a steel or sheet-iron exterior or sheath. This sheath I prefer to form by winding upon the core strips of steel and welding the coils thereof together either by the electrical process or otherwise. I may use only one layer of these strips, as shown in full lines, Fig. 25, or I may use two layers, the second being shown in dotted lines. These bimetallic cables or conductor may have, as shown in Fig. 24, a solid core and a solid sheath, as at *a*, or a solid core and a twisted or braided wire sheath, as at *b*, or a wire core and a solid sheath, as at *c*, or a wire core and a wire sheath, as at *d*. In a cable thus constructed the copper core insures good conduction, the sheath of course assisting, and the iron or steel sheath while adding tensile strength also furnishes a good wear-resisting surface for the grips, which shall also be a conductor for the currents branching to or from the cable, and is a very essential feature in a telpher system.

Figure 26:
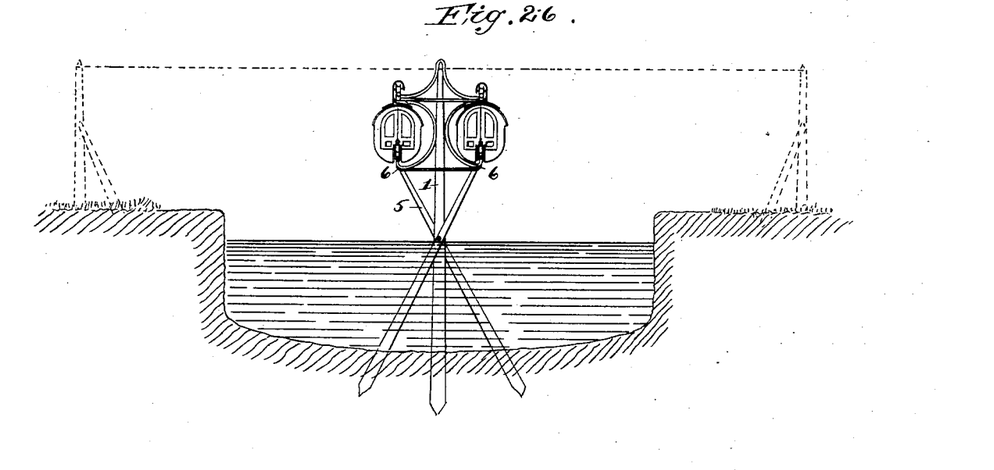
Figs. 26 and 27 represent my towing system arranged in the middle of the canal on posts and by means of suspension devices, respectively.
Figure 27:
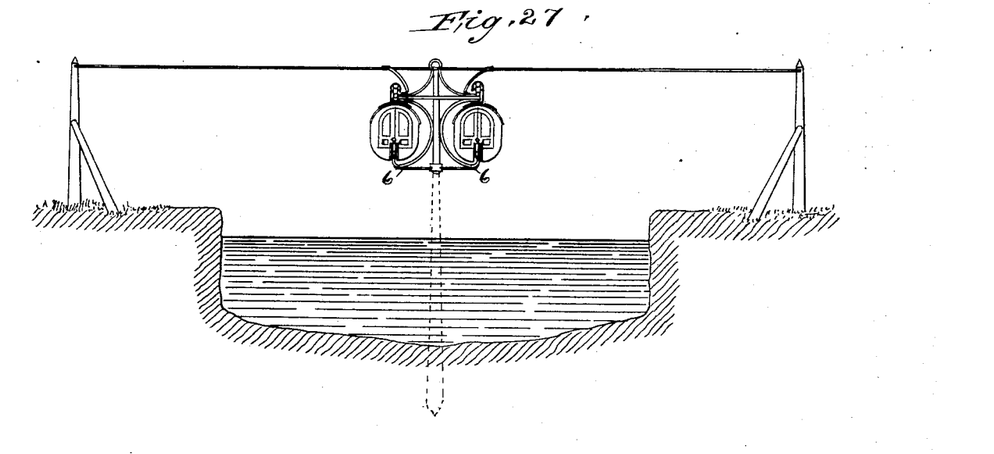

Fig. 26 illustrates the location of my system through the middle of the canal, where it is supported on posts suitably braced. In this construction two lines of way are mounted together, the up car passing on one side of the post and the down car on the other. In Fig. 27 a similar location of the lines of way is shown; but the supports are located upon the banks of the canal and connected by a stay from which said lines of way depend, the supports on the tow-path being located outside of the tow-path, so as not to prevent towing by mules or horses. These two modes of support may be combined, if desired. For instance, in Fig. 26 the suspension-support may be added to the other, as indicated in dotted lines, while in Fig. 27 the suspension-support may be supplemented by a pole running from the lines of way to the bottom of the canal, as indicated in dotted lines.

It is obvious that various changes may be made in the construction of details and the arrangement of parts without departing from the spirit of my invention.

What I claim as my invention is—

1. In an electric towing system, poles placed along the canal, braces placed to resist lateral and longitudinal strain upon said poles, a track supported in brackets extending from said braces, another track secured in brackets projecting from the upper ends of said poles, and a motor constructed to run between said tracks, substantially as shown and described.

2. In an electric towing system, a series of poles located outside of the tow-path and braced against lateral and longitudinal strains, electric tracks or cables one mounted upon said braces and another upon said poles, a motor running upon said tracks, and means for connecting said motor to a canal-boat.

3. In a telpher system, the combination with suitable supports located along the line of way, of an electric traction-cable supported thereby, a sectional working-circuit cable with each section insulated from the others at said supports and attached at its ends thereto, a feed-wire, taps leading from the feed-wire to each section of the working circuit at one of the attached ends thereof, switches in said taps, and magnets for operating said switches energized from a source of power carried by a car running on said cables.

4. In a telpher system, the combination with suitable supports, of the traction-cable used as a common return, the sectional working-circuit cable having long sections extending from one support to another and short sections located at the supports, the feed-wire with its taps leading to the long sections of the working circuit, branches from said taps leading to the short sections, electromagnetic switches located in said taps, a motor constructed to run on said cables, and a source of current thereon for successively closing said switches and transmitting the current to the traction-cable to hold each switch closed so long as the motor is on the section connected thereto.

5. In a telpher system, the combination with the traction-cable acting as the return-circuit, of a feed-wire, a working-circuit cable divided into sections extending from one support to another, short sections of said working-circuit cable interposed and insulated from the longer ones, an electromagnet located in a connection extending from a short section to one of the adjacent longer sections, an armature controlled thereby for closing circuit from the feed-wire to the working circuit, and a source of current carried on the train for closing circuit through said magnet.

6. In a telpher system, the combination of a feed-wire, a working-circuit conductor divided into sections extending from one support to another, short intermediate sections insulated from the longer ones, an electric light in a return-circuit branch leading from a short intermediate section, an electromagnet located in a connection extending from a short section to one of the adjacent longer sections, an armature controlled by said magnet for closing circuit from the feed-wire to the light and to the working circuit, and means for closing circuit through said magnet.

7. In a telpher system, the combination with an upper and a lower cable, of a car constructed to overhang the lower cable and provided with a suspension-trolley for engagement with the upper cable.

8. In an electric telpher system, the combination with the car traveling on the track thereof, of opposed gripping electrical contact-wheels carried by said car, a motor for rotating said wheels, a regulable tension device determining the gripping effect of said wheels upon the track, and means for throwing said wheels into and out of engagement with the track.

9. In a telpher system, the combination with the car and its track, of rotating shafts hinged at one end to the frame of the car and carrying gripping propelling-wheels engaging with the track, and a tension device for said wheels for causing them to grip said track and propel the car.

10. In a telpher system, the combination with the car and its track, of hinged shafts carrying gripping-wheels and also carrying a motor for rotating said wheels, and a tension device for causing said wheels to grip the track.

11. In a telpher system, the combination with the car and its track, of hinged shafts carrying gripping-wheels, a motor for rotating said wheels, and means for causing the wheels to grip the track and propel the car.

12. In a telpher system, the combination with a car and its track, of rotating shafts suspended by ball-and-socket joints, traction grip-wheels on said shafts engaging with the track, gear-wheels also on said shafts, and rotary motors carrying gears in mesh with said gear-wheels.

13. In a telpher system, the combination, with a car and its track, of a pair of shafts hinged on each side of one rail or cable of said track, a casing supported on each pair of shafts, a motor therein carrying gears on either end of its driving-shaft in mesh with gears on the hinged shafts, and traction-wheels engaging with said rail or cable.

14. In a telpher system, the combination with a car and its track, of a pair of shafts hinged on each side of the traction rail or cable of said track, an electric motor supported on each pair of shafts and provided with worms at the ends of its armature-shafts, gears upon said hinged shafts in mesh with said worms, grip-wheels located on the hinged shafts, and means for swinging said wheels to and from said rail or cable.

15. In a rotary traction-grip, the combination with the hinged shafts carrying the gripping-wheels, of a rod connected to said shafts, a spring operating thereon to swing the gripping-wheels toward each other, and means for swinging said wheels in the reverse direction.

16. In a rotary traction-grip, the combination with the hinged shafts carrying the gripping-wheels, of a rod connected to said shafts, a spring operating thereon to press said wheels toward each other, means on said rod for changing the tension of said spring, and a device for depressing said rod against the action of said spring to move the wheels away from each other.

17. In a rotary traction-grip, hinged shafts carrying the gripping-wheels, a screw-threaded spring-seated rod connected to said shafts, a hand-wheel on said rod for rotating it to change the tension of said spring, a screw-threaded sleeve encircling said rod and turning in a fixed nut, and a hand-wheel upon said sleeve provided with means for engaging said rod to force the grip-wheels from each other.

18. The combination with a traction cable or rail of a rotary traction-grip, a spring for holding the grip in engagement with the cable or rail, a tension device for said spring, and means for depressing the spring to throw the grip out of engagement.

19. The combination with the hinged shaft fluted at its lower end to form integral splines, of the grooved grip-wheel with its bore radially grooved to fit said splines, and a stop for retaining said wheel on its shaft.

20. The bracket for the traction-cable, provided with a prolonged loop for the reception of said cable, a depression in one side of the interior of said loop and with perforations opposite said depression one of which is screw-threaded, in combination with a plate to be placed under the screw-threaded perforation to receive the end of a tool used in depressing the cable.

21. The combination with a trolley-wheel concaved at its ends and mounted upon a fixed axle, insulated bushings for said axle, and concaved spring-disks confined within the concavities of the wheel between said bushings and the periphery of said wheel.

22. In a car for a telpher system, the combination with the main body portion thereof, of the motor and grip located below the floor of the car, grip-controlling devices projecting above the floor, and extensions from the sides of the car-body forming shields for the motor and grip.

23. The combination with the sides and floor of the car, of the mid-ribs in which the supporting-wheels are journaled, and the motors and grip mechanism attached to said mid-ribs.

24. The combination with a suspension-trolley wheel, of a support therefor provided with opposed apertures the side walls of which are beveled outward, journal-boxes for the trolley-axle beveled to fit said apertures and mounted on springs therein, and guide-rods passing through said boxes and springs for retaining them in place.

25. The combination with the sides and floor of the car, of the mid-ribs extending therethrough, wheels journaled therein, motors and grip mechanism attached thereto, the split keel secured to said mid-ribs and passing beneath said mechanism and furnishing attachment for the extension of the sides of the car.

26. In a telpher system, the combination with a car provided with suspension-trolleys, of a cover for said trolleys extending from one to another and acting as a brace therefor.

27. In a telpher system, the combination of a sectional conductor, a car having suspension-trolleys running thereon, and a cover for said trolleys extending from one to the other to act as a brace therefor and suitably insulated from said trolleys.

28. A fastening for the end of a cable or conductor consisting of a block of conducting material provided with a channel therein through which the end of a conductor may pass, be recurved and secured, and means for securing the core of said conductor to said block.

29. A fastening for the end of an electric cable consisting of a block of malleable metal provided with a channel therein through which the end of the cable may pass and be recurved, and with a clip which may be driven down upon said recurved end.

30. The combination with a bimetallic cable, of a fastening for the end thereof consisting of a block of malleable metal provided with a channel therein through which the end of the cable may be passed and recurved, a clip for confining said recurved end, and means for securing the core thereof to said block.

31. In a telpher system, insulated conducting-sections of cable, and a coupling for joining the ends of adjacent sections provided with a section of conductor interposed between and insulated from the sections of cable and forming a part of a controlling-circuit in said system.

32. In a telpher system, the combination with a coupling for two sections of cable, of a graduated resistance mounted on the coupling between the ends of said sections to be engaged by the current-collector, as it passes from one section to the other.

33. A coupling between two sections of a conductor consisting of two metallic blocks provided with fastening means for said sections, insulation interposed between said blocks, and bolts for securing the two blocks together.

34. A coupling between two sections of conductor consisting of two metallic blocks one secured to the end of each section, a graduated resistance adjacent to each block, insulation interposed between said resistances, and bolts for securing together said blocks, resistances and insulation.

35. In a sectional conductor, the combination of the blocks secured to the ends of two sections, an interposed short section, insulation between the short section and said blocks, and means for securing together the blocks, short section and interposed insulation.

36. In a sectional conductor, the combination of the blocks secured to the ends of two meeting sections, an interposed short section, graduated resistances adjacent to the blocks and to the ends of said short sections, insulation between said resistances, and means for securing said parts together.

37. In a sectional conductor, the combination of blocks secured to the ends of two meeting sections, an interposed short section, insulation between said blocks and short section, projecting plates embedded in said insulation, bolts securing together said blocks, short section, insulation and plates, and means for securing said plates to a suitable support.

38. The combination with a suspended cable, of a securing means therefor consisting of a fixed plate provided with a perforation at one side of the cable, a detachable plate provided with a tongue fitting into said perforation, and means for clamping said plates together.

39. The combination with a suspended insulated electric cable, of a securing-clamp therefor, consisting of two plates hinged together one of which is provided with means for piercing the insulation and penetrating into the meshes of the cable.

40. The combination with an electric cable, consisting of several strands, of a tap connected thereto consisting of a clamp provided with a suitable conductor or contact and with several internally-projecting prongs for entering in between the meshes of the cable and making permanent contact therewith.

41. A switch-box secured to a suitable support, an electric cable passing therethrough, insulating-posts secured to the box on either side of the cable for supporting it, a cover for said box, and screws passing through said cover and into said posts.

42. The combination with a post, of a hollow bracket-arm with a screw-threaded end projecting through said post and serving as a conduit for conductors, of a switch-box screwed to said arm and secured to the post.

43. In an electric switch, the combination of a holder provided with contact-surfaces, and a magnet provided with strips of insulation and removably fitted to said holder and having the ends of its coils exposed and extended along said insulation for engagement with said contact-surfaces.

44. The combination with a suitable base, of conducting-posts arising therefrom and provided with means for securing conductors thereto, of a magnet provided with insulated ways for removably fitting it to said posts and having the ends of its coils bared and extended along said guideways for engagement with said posts.

45. The combination with a suitable conducting-support, of a magnet removable therefrom provided with insulated guideways, an armature pivoted to one of said ways and carrying a contact-bar, and transmitting and receiving contacts for engagement by said bar.

46. The combination with a pivoted armature-lever, of a spring therefor partially coiled about its pivot and having one end secured to the armature-support, and a tension-screw secured to the armature and engaging the free end of said spring.

47. The combination with a pivoted armature-lever, of a spring having one end secured to the pivot of the lever and the other projected at the back of said lever, and a tension-screw pivoted to the back of the lever and engaging the projecting end of the spring.

48. In a bimetallic cable, the combination with an inner conductor, of an outer conductor consisting of spiral strips or bands substantially as shown wound thereon and welded together.

49. In a telpher system, the combination of an upper track or cable, a lower track or cable, one of said tracks serving as an electric lead and the other as an electric return, a car traveling between said cables, two or more electric motors in the car driven by the current from the tracks, and a gripping propelling device independent of the supporting-wheels of the car engaging one of said tracks, said devices consisting of several sets of wheels each set provided with a motor and operating on the side of the track opposite to another set.

50. In an electric railway, the combination with a car and its tracks of a frame hinged to suitable supports on the car, a motor mounted on said frame and traction gripping-wheels on shafts geared to said motor and journaled in said frame, said frame being adapted to swing toward the track for the engagement therewith of the gripping-wheels.

Signed at New York, in the county of New York and State of New York, this 13th day of February, A. D. 1894.

HARDING F. GRAY.

Witnesses:
T. F. KEHOE,
DELBERT H. DECKER.